United States Patent
Buerger

(10) Patent No.: US 12,017,689 B2
(45) Date of Patent: Jun. 25, 2024

(54) METHOD FOR DETERMINING AN ACTUAL POSITION OF RAILS OF A TRACK

(71) Applicant: Plasser & Theurer Export von Bahnbaumaschinen GmbH, Vienna (AT)

(72) Inventor: Martin Buerger, Linz (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 899 days.

(21) Appl. No.: 17/046,501

(22) PCT Filed: May 2, 2019

(86) PCT No.: PCT/EP2019/061178
§ 371 (c)(1),
(2) Date: Oct. 9, 2020

(87) PCT Pub. No.: WO2019/228742
PCT Pub. Date: Dec. 5, 2019

(65) Prior Publication Data
US 2021/0146970 A1     May 20, 2021

(30) Foreign Application Priority Data
Jun. 1, 2018  (AT) .................................. A 159/2018

(51) Int. Cl.
*B61K 9/08*        (2006.01)
*B60M 1/28*        (2006.01)
(Continued)

(52) U.S. Cl.
CPC .............. *B61K 9/08* (2013.01); *B61L 23/041* (2013.01); *B61L 23/047* (2013.01); *E01B 35/06* (2013.01); *E01B 2203/16* (2013.01); *G01C 7/04* (2013.01)

(58) Field of Classification Search
None
See application file for complete search history.

(56) References Cited

U.S. PATENT DOCUMENTS 5,331,745 A    7/1994  Jager
7,979,995 B2   7/2011  Theurer et al.
(Continued)

FOREIGN PATENT DOCUMENTS

AT    514502 A1    1/2015
AT    518692 A1    12/2017
(Continued)

OTHER PUBLICATIONS

Chinese Office Action in Chinese Application No. 201980031950.1 dated May 18, 2022 in English.
(Continued)

*Primary Examiner* — Aniss Chad
*Assistant Examiner* — Mahmoud M Kazimi
(74) *Attorney, Agent, or Firm* — Collard & Roe, P.C.

(57) ABSTRACT

The invention relates to a method for determining an actual position of rails of a track by means of an optical sensor device, positioned on a rail vehicle, for recording the position of the track and adjacent installations. In this, it is provided that, by means of the sensor device, a course of the track and a course of the adjacent installations, in particular a catenary installation, are recorded for a track section as preliminary actual data, and that the preliminary actual data are transformed into corrected actual data in an evaluation device in that a recorded course of at least one adjacent installation is transformed into a course with a specified geometric shape. In addition, the invention relates to a system for implementing the method.

15 Claims, 3 Drawing Sheets

(51) Int. Cl.
*B61L 23/04* (2006.01)
*E01B 35/06* (2006.01)
*G01C 7/04* (2006.01)

(56) References Cited

U.S. PATENT DOCUMENTS

| | | | |
|---|---|---|---|
| 9,863,097 B2 | 1/2018 | Lintz | |
| 10,589,763 B2 * | 3/2020 | Buerger | G01C 11/06 |
| 10,740,936 B2 | 8/2020 | Irie et al. | |
| 2012/0274772 A1 | 11/2012 | Fosburgh et al. | |
| 2012/0300060 A1 * | 11/2012 | Farritor | B61K 9/08 |
| | | | 348/125 |
| 2017/0066459 A1 * | 3/2017 | Singh | G06F 18/2431 |
| 2019/0136462 A1 | 5/2019 | Buerger et al. | |
| 2020/0074176 A1 * | 3/2020 | Birchbauer | G06V 20/176 |
| 2023/0365170 A1 * | 11/2023 | Auer | B61K 9/08 |

FOREIGN PATENT DOCUMENTS

| | | |
|---|---|---|
| AT | 519218 B1 | 5/2018 |
| AU | 201800145 A1 | 8/2018 |
| CH | 683703 A5 | 4/1994 |
| CN | 101765689 A | 6/2010 |
| CN | 105492693 A | 4/2016 |
| CN | 106087621 A | 11/2016 |
| DE | 10 2012 203 483 A1 | 10/2012 |
| EP | 3 138 754 A1 | 3/2017 |
| WO | 2012/161759 A1 | 11/2012 |
| WO | 2015/003772 A1 | 1/2015 |
| WO | WO-2015003772 A1 * | 1/2015 ............... B61K 9/08 |
| WO | 2018/087931 A1 | 5/2018 |

OTHER PUBLICATIONS

Chinese Office Action in Chinese Application No. 201980031950.1 dated May 18, 2022 in Chinese.
Pantiushin et al., "Control Measurement System for Railway Track Position", Dep. OEPS National Research Univ. of Information Technologies, Mechanics and Optics, Proc. of SPIE, vol. 8486, 2012 pp. 1-7 (7 pages).
International Search Report of PCT/EP2019/061178, mailed Aug. 12, 2019, with English translation.
Austrian Search Report in Austrian Application No. A 159/2018 dated Aug. 13, 2018.
Indian Office Action in Indian Application No. 202027043484 dated May 13, 2022 with English translation.

* cited by examiner

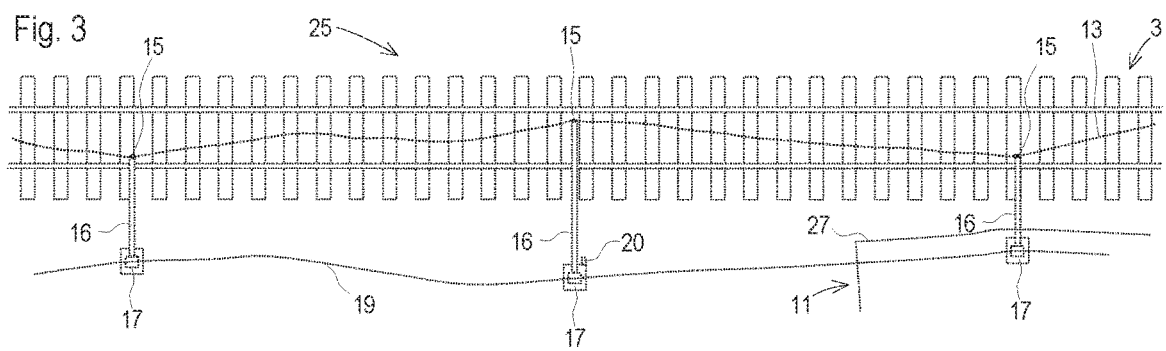
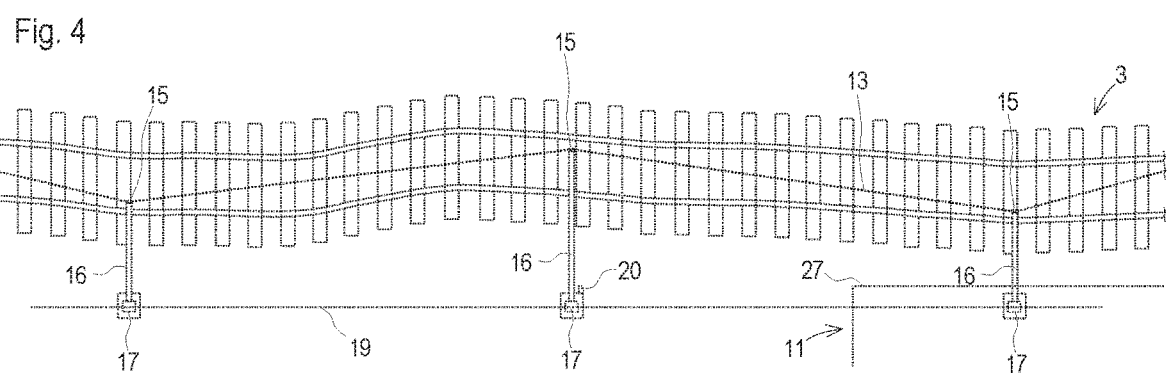

METHOD FOR DETERMINING AN ACTUAL POSITION OF RAILS OF A TRACK

CROSS REFERENCE TO RELATED APPLICATIONS

This application is the National Stage of PCT/EP2019/061178 filed on May 2, 2019, which claims priority under 35 U.S.C. § 119 of Austrian Application No. A 159/2018, filed on Jun. 1, 2018, the disclosure of which is incorporated by reference. The international application under PCT article 21(2) was not published in English.

FIELD OF TECHNOLOGY

The invention relates to a method for determining an actual position of rails of a track by means of an optical sensor device, positioned on a rail vehicle, for recording the position of the track and adjacent installations. The invention further relates to a system for implementing the method.

PRIOR ART

For maintenance of the track permanent way, recurrent controls are required. In this, the actual position of a track is surveyed at regular intervals in order to evaluate deteriorations and to optionally derive guidelines for maintenance measures. As a rule, this takes place with a track measuring vehicle on which several measuring systems are arranged. In particular, optical sensor devices are used to record the surface contour of the track and its surroundings.

AT 514 502 A1 describes a measuring system in which a laser scanner, moved continuously along a track, is used for determining the position of a fixed point of the track. By way of a distance to a recognized fixed point marker, an actual position of the track traced by an on-track undercarriage is evaluated with respect to a desired position.

AT 518 692 A1 also discloses a laser scanner, arranged on a rail vehicle, by means of which surface contours of a track and its surroundings are recorded while travelling upon said track. The result is a point cloud of which the respective point coordinates relate initially to a coordinate system carried along with the laser scanner.

Thus, when recording the track and its surroundings in this manner, it is necessary to also record the motion of this carried-along coordinate system with respect to a stationary or inert reference system. Specifically, the curve, longitudinal level and super-elevation must be corrected since the laser scanner moves along with the rail vehicle when travelling through a track curve. During this, a change of position during curve travel is recorded by means of an inertial measuring unit, for example.

SUMMARY OF THE INVENTION

It is the object of the invention to indicate an improvement over the prior art for a rail vehicle of the type mentioned at the beginning.

According to the invention, these objects are achieved by way of the features of claims 1 and 13. Dependent claims indicate advantageous embodiments of the invention.

In this, it is provided that, by means of the sensor device, a course of the track and a course of the adjacent installations, in particular a catenary installation, are recorded for a track section as preliminary actual data, and that the preliminary actual data are transformed into corrected actual data in an evaluation device in that a recorded course of at least one adjacent installation is transformed into a course with a specified geometric shape. In this manner, also-recorded position data of existing infrastructure installations with known geometric shapes are used to carry out the data correction. The distortions of the actual data, occurring as a result of motions of the sensor device during data recording, are compensated without additional effort. Thus, no separate recording of the motions of the sensor device or the rail vehicle is required.

For the transformation of the actual data, it is advantageously provided that a straight line is specified as geometric shape for the recorded course of a contact wire of the catenary installation between two fastening points on mast cantilevers. Due to the pre-tensioning in the contact wire, the latter retains its shape also in the case of wind or strain by a pantograph, wherein slight deviations from the straight course can be neglected.

For automatic recording of the respective fastening point on a mast cantilever it is advantageous if a point with a maximal curvature is determined for the recorded course of the contact wire. As a rule, the contact wire changes direction at the fastening points, so that the contact wire runs zig-zagging in the horizontal plane. With this, the grinding-in of grooves in graphite wearing strips of the pantograph is avoided. This feature of the catenary installation is used to determine the positions of the fastening points or the mast cantilevers by way of the recorded contact wire course.

In order to further enhance the precision of the method, it is useful if the course of the contact wire is recorded as a course of a contact wire edge. This is advantageous particularly when using a high-resolution sensor device. Especially the lower contact wire edge is precisely recorded, for example, by means of a laser scanner with horizontal rotation axis.

A further advantageous variant provides that a straight line is specified as geometric shape for a recorded platform edge in order to transform the preliminary actual data into corrected actual data. This infrastructure installation which is uninfluenced by extremal conditions is available in every railway station area to carry out the data transformation.

If a tip line between two mast tips is present, the same is favourably also used to carry out the data transformation. In this, a funicular curve is specified as geometric shape for the tip line. In this manner, at least a sufficient correction of the recorded track course in lateral direction can be carried out.

In a further improvement, surface profiles extending approximately transversely to the track are recorded by means of the sensor device during travel of the rail vehicle along the track, wherein from this a point cloud of the track and of the adjacent installations are stored as preliminary actual data. For processing corresponding data, efficient algorithms are known which enable a quick data transformation. In addition, filter methods can be used to reduce the data volume. For example, only the surface points of the rails and the contact wire are processed further. Storing the point cloud favourably takes place in the evaluation device to ensure efficient data processing.

In this, it is useful if the surface points of the contact wire and the rails are filtered from the point cloud by means of an algorithm set up in the evaluation device. This takes place, for example, by means of automatized pattern recognition or by semantic segmentation of the point cloud. As a result, the computing effort for transforming the preliminary actual data into corrected actual data is reduced.

In a further development of the method, an absolute position for a respective fastening point of the contact wire to the corresponding mast cantilever is prescribed to the evaluation device. The coordinates, recorded by means of the sensor device, of the respective fastening point can thus be transformed true-to-position into a stationary coordinate system. Advantageously, this takes place in the course of the data transformation. As a result, all corrected actual data reflect the true absolute position of the recorded courses.

Alternatively, or to enhance the precision, it is useful if at least one fixed point marker arranged beside the track is recorded by means of the sensor device. In this manner, a further reference is used for determining the absolute position of the recorded courses. In this, already recorded fastening points of the catenary installation indicate the approximate position of a fixed point marker mounted on the corresponding mast.

A further development of the method provides that a super-elevation of the track is recorded by an inertial measuring unit (IMU) arranged on the rail vehicle, or by a clinometer. This measuring device is advantageously arranged on an on-track undercarriage. The super-elevation values recorded by this are available in addition to the corrected actual data for the planning and execution of maintenance measures.

In order to increase the precision when determining the actual position of the track, it is useful if the course of the track is recorded as a course of a rail edge. For this purpose, for example, a pattern recognition software is set up in the evaluation device in order to compare the recorded actual data to predefined rail profiles and to thus determine a rail edge course.

The system, according to the invention, for implementation of one of the afore-mentioned methods provides that the sensor device is designed for recording a course of the track and a course of the adjacent installations, that preliminary actual data resulting from a recording process are fed to the evaluation device, and that the evaluation device is designed for calculating corrected actual data by way of a transformation of a recorded course of at least one adjacent installation into a course with a specified geometric shape. Such a system does not require any additional measuring devices to compensate the motions of the sensor device occurring during data recording.

An advantageous embodiment of the system provides that an inertial measuring unit (IMU) or a clinometer for recording a super-elevation is arranged on an on-track undercarriage. The motions of the IMU are recorded precisely in the three-dimensional space and serves for continuous position determination with respect to a stationary reference system. Thus, the IMU as well as a clinometer delivers exact measuring values of a track super-elevation.

A further development of the system provides that that the optical sensor device comprises a laser scanner with a rotation axis which is aligned in particular horizontally. With this, it is possible to record in an efficient manner high-resolution position data of the track course and adjacent infrastructure installations during travel of the rail vehicle.

BRIEF DESCRIPTION OF THE DRAWINGS

The invention will be described below by way of example with reference to the accompanying drawings. There is shown in a schematic manner in:

FIG. 3 recorded preliminary actual data as a point cloud

FIG. 4 corrected actual data as a point cloud

DESCRIPTION OF THE EMBODIMENTS

Figure 1:
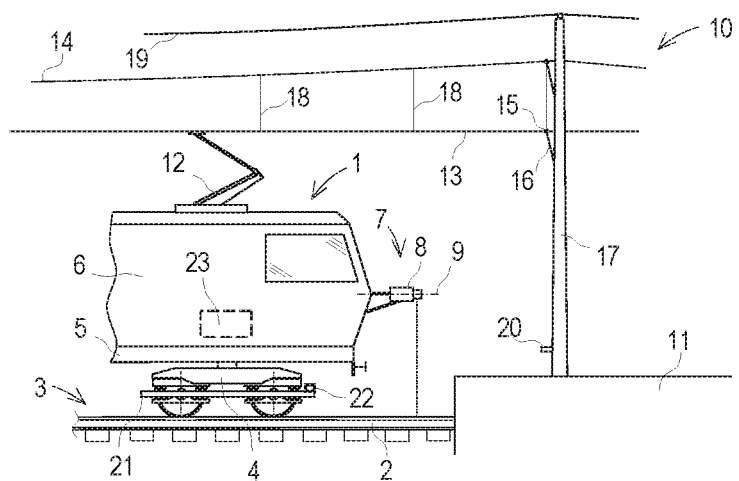
FIG. 1 a side view of a rail vehicle with a sensor device

FIG. 1 shows a front section of a rail vehicle 1, shown in simplified form, for determining an actual position of rails 2 of a track 3. This is, for example, a measuring car, a maintenance vehicle or other rail vehicle with metrological auxiliary equipment. The rail vehicle 1 is mobile by means of on-track undercarriages 4 on the track 3 and comprises a vehicle frame 5 with a vehicle superstructure 6. Arranged at a front of the vehicle superstructure 6 is a sensor device 7 comprising, for example, a laser scanner 8. In this, a laser beam rotates about a rotation axis 9 oriented in the vehicle longitudinal direction and measures, at clocked time intervals, distances to surface points of the track 3 including adjacent installations 10, 11.

A pantograph 12 is positioned on the vehicle superstructure 6 to supply the rail vehicle 1 with energy via a catenary installation 10. The catenary installation 10 comprises a contact wire 13 and a carrying cable 14. Arranged at regular intervals are fastening points 15 at which the contact wire 13 is fastened in each case to a mast cantilever 16 of a mast 17. Between the mast cantilevers 16, the contact wire 13 is suspended from the carrying cable 14 by means of hangers 18. Additionally, a so-called tip line 19 runs from mast tip to mast tip.

For documentation of the absolute position of the track- or catenary installation 10, fixed point markers 20 are normally used which are fastened to masts 17, for example. The exact positions of these fixed point markers 17 are noted in a location plan. For the present invention it is additionally useful if absolute position coordinates for the fastening points 15 are surveyed and documented.

For recording a track super-elevation, an on-track undercarriage 4 comprises a measuring frame 21 on which an inertial measuring unit (IMU) 22 is arranged. In this, the measuring frame 21 is coupled directly to the wheel axles, so that it follows the track course without relative movements. Alternatively, a clinometer can serve for recording the track super-elevation. Furthermore, an evaluation device 23 for data processing of the measuring results is arranged in the rail vehicle 1.

Figure 2:
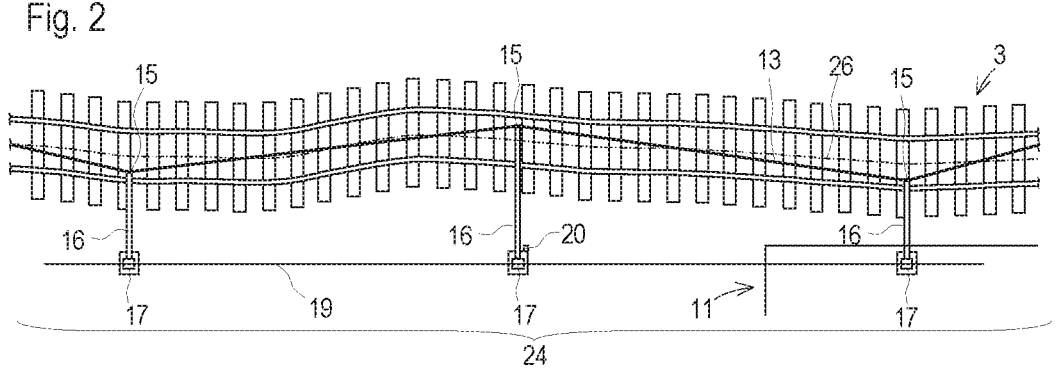
FIG. 2 a top view of a track section to be recorded
Figure 5:
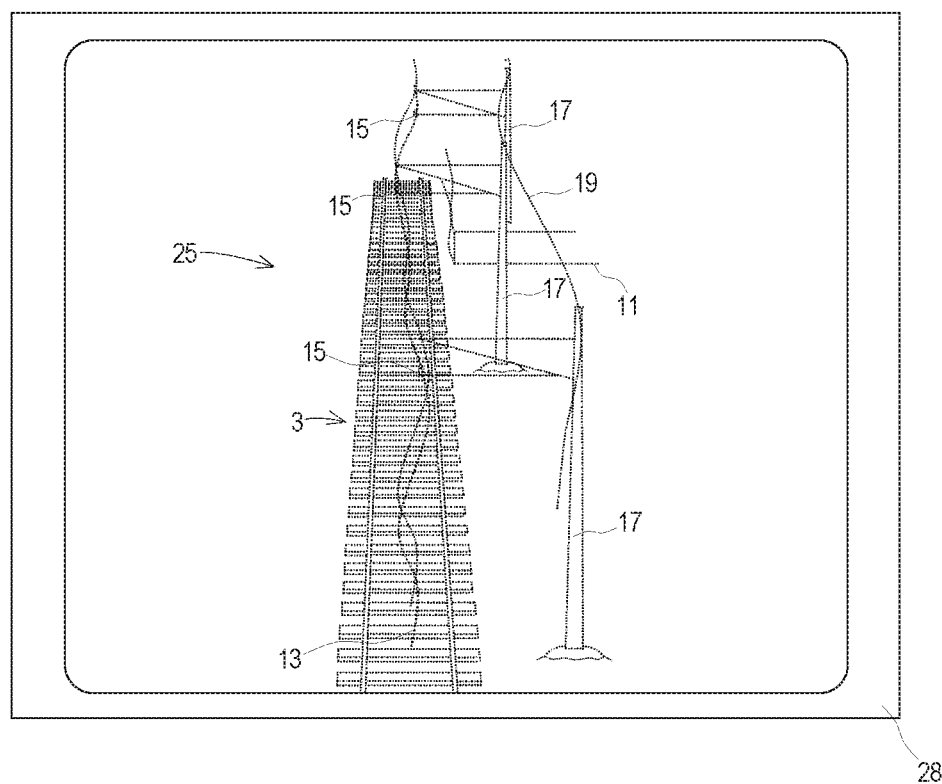
FIG. 5 perspective depiction of the point cloud

FIG. 2 shows a top view of a track section 24 with greatly exaggerated curve radii or distortions in order to illustrate the teaching of the present invention. When travelling over this track section 24, the laser scanner 8 records surface profiles of the track 3, the catenary installation 10 and further installations such as, for example, a platform 11. In particular, coordinates for each recorded point are recorded in a reference system of the sensor device 7, so that a point cloud 25 is formed for the entire track section 24.

Since the reference system of the sensor device 7 moves along with the vehicle frame during the data recording, the point cloud 25 is initially distorted, as shown in FIG. 3. In this, the rails 2 appear to be approximately straight, since the rotation axis 9 of the laser scanner 8 is guided in essence tangentially to the track axis 26. An actually present curve radius of the track 3 causes all other recorded installations 10, 11 to be recorded in a curved manner, wherein these preliminarily recorded apparent rail curvatures correlate to the curvature of the track 3. In particular, the recorded apparent curvature of the contact wire 13 correlates to the true track curvature. Along with capturing the course of the contact wire 13 in the three-dimensional space, a longitudinal inclination of the track 3 is also recorded.

The preliminary actual data recorded by means of the sensor device 7 are fed to the evaluation device 23 in order to carry out a transformation into corrected actual data. To that end, first the fastening points 15 of the contact wire 13 are determined. Due to the zig-zag arrangement, these are the points with a maximal curvature. For the further method, it is stipulated that the contact wire 13 extends between the fastening points 15 in the shape of a straight line. Slight deviations due to wind load or a contact force of the pantograph 12 can usually be neglected. To increase precision, these factors of influence are measured, and compensated by calculation.

Temporarily, the points of the point cloud 25 which indicate the course of the contact wire 13 form a polygon course. During the data transformation, this polygon course is aligned along the specified straight line in a common reference system. In this, each segment (stretch) of the polygon course is shifted and rotated mathematically. In addition, all points of the point cloud 25 which lie on a plane perpendicular to the respective segment are correspondingly shifted and rotated along. In this manner, all points of the point cloud 25 are transformed, so that the result are corrected actual data. The transformed point cloud shown in FIG. 4 thus reflects the actual curvature of the track 3.

Other recorded courses can be used in a corresponding manner in place of the contact wire course for transformation of the actual data. For example, a straight line can be specified as geometric shape for a recorded edge 27 of the platform 11. Or a downward sagging cable curve is specified for the tip line 19 from mast 17 to mast 17. Also, corresponding geometric shapes can be specified for several recorded installations 10, 11. Then, for aligning the polygon segments during the data transformation, an optimum is determined which best corresponds to all specifications.

A further improvement of the method provides that absolute coordinates, noted in location plans, of the fastening points 15 of the contact wire 13 are used during the data transformation. These reference points determine in the common reference system the position of the respective straight line for the alignment of the apparent course of the contact wire 13. Then, the resulting corrected actual data reflect not only the correct curvatures, but also the correct position in the field.

For determining the absolute position, it is also possible to use the fixed point markers 20 if these are also recorded in the point cloud 25. In this, the recognition of the corresponding surface points in the point cloud 25 takes place, like in the elements of the catenary installation 10 or the platforms 11, by semantic segmentation or pattern recognition.

For monitoring the data transformation, the point cloud 25 can be shown on a monitor 27. FIG. 4 shows the point cloud 25 of the recorded track section 24 in a central perspective with the preliminary actual data.

The invention claimed is:

1. A method for determining an actual position of rails of a track by means of an optical sensor device, positioned on a rail vehicle, for recording the position of the track and adjacent installations, comprising the steps of:
 recording for a track section by means of the optical sensor device, a course of the track and a course of the adjacent catenary installations, as preliminary actual data, and
 transforming that the preliminary actual data into corrected actual data in an evaluation device wherein a recorded course of at least one adjacent installation is transformed into a course with a specified geometric shape;
 wherein the preliminary data is transformed into a polygon course, wherein the points of the point cloud which indicate the course of the at least one adjacent installation form said polygon course, during the data transformation, this polygon course is aligned along the specified straight line in a common reference system, each segment of the polygon course is shifted and rotated mathematically, and all points of the point cloud which lie on a plane perpendicular to the respective segment are correspondingly shifted and rotated along, in this manner, all points of the point cloud are transformed, so that the result are corrected actual data to ensure efficient data processing; so that the computing effort for transforming the preliminary actual data into corrected actual data is reduced;
 scanning the track using a scanner to determine an elevation of the track and recording said elevation by a clinometer arranged on the rail vehicle.

2. The method according to claim 1, wherein a straight line is specified as geometric shape for the recorded course of a contact wire of the catenary installation between two fastening points on mast cantilevers.

3. The method according to claim 2, wherein the respective fastening point on a mast cantilever is recorded wherein a point with a maximal curvature is determined for the recorded course of the contact wire.

4. The method according to claim 2, wherein the course of the contact wire is recorded as a course of a contact wire edge.

5. The method according to claim 1, wherein a straight line is specified as geometric shape for a recorded platform edge.

6. The method according to claim 1, wherein a funicular curve is specified as geometric shape for a tip line between two mast tips.

7. The method according to claim 1, wherein surface profiles extending approximately transversely to the track axis are recorded by means of the optical sensor device during travel of the rail vehicle along the track, and that from this a point cloud of the track and of the adjacent installations is stored as preliminary actual data.

8. The method according to claim 7, wherein the surface points of the contact wire and the rails are filtered from the point cloud by means of an algorithm set up in the evaluation device.

9. The method according to claim 1, wherein an absolute position for a respective fastening point of the contact wire to the corresponding mast cantilever is prescribed to the evaluation device.

10. The method according to claim 1, wherein at least one fixed point marker arranged beside the track is recorded by means of the optical sensor device.

11. The method according to claim 1, wherein the course of the track is recorded as a course of a rail edge.

12. A system for implementing a method according to claim 1, wherein the optical sensor device is designed for recording a course of the track and a course of the adjacent installations, that preliminary actual data resulting from a recording process are fed to the evaluation device, and that the evaluation device is designed for calculating corrected actual data by way of a transformation of a recorded course of at least one adjacent installation into a course with a specified geometric shape.

13. The system according to claim 12, wherein an inertial measuring unit or a clinometer for recording a super-elevation is arranged on an on-track undercarriage on the rail vehicle.

14. The system according to claim 12, wherein the optical sensor device comprises a laser scanner.

15. The system as in claim 1, wherein the display of the point cloud comprising the corrected actual data is for the planning and execution of maintenance measures.

* * * * *